US011879320B2

(12) United States Patent
Coon et al.

(10) Patent No.: US 11,879,320 B2
(45) Date of Patent: Jan. 23, 2024

(54) PARTICLE TRAP APPARATUS AND METHOD

(71) Applicant: PetroQuip Energy Services, LLC, Waller, TX (US)

(72) Inventors: Robert Joe Coon, Missouri City, TX (US); Roddie R. Smith, Katy, TX (US); John Lee Emerson, Katy, TX (US); Josh Hornsby, Waller, TX (US)

(73) Assignee: PetroQuip Energy Services, LLC, Waller, TX (US)

( * ) Notice: Subject to any disclaimer, the term of this patent is extended or adjusted under 35 U.S.C. 154(b) by 161 days.

(21) Appl. No.: 17/557,692

(22) Filed: Dec. 21, 2021

(65) Prior Publication Data
US 2022/0331714 A1 Oct. 20, 2022

Related U.S. Application Data

(60) Provisional application No. 63/177,248, filed on Apr. 20, 2021.

(51) Int. Cl.
| *E21B 43/34* | (2006.01) |
| *B01D 21/00* | (2006.01) |
| *E21B 43/38* | (2006.01) |
| *E21B 43/12* | (2006.01) |

(52) U.S. Cl.
CPC .......... *E21B 43/35* (2020.05); *B01D 21/0024* (2013.01); *B01D 21/0066* (2013.01); *B01D 21/0087* (2013.01); *E21B 43/38* (2013.01); *E21B 43/122* (2013.01); *E21B 43/128* (2013.01)

(58) Field of Classification Search
CPC ............ B01D 21/0066; B01D 21/0024; B01D 21/0087; E21B 43/35; E21B 43/122; E21B 43/128; E21B 43/38
See application file for complete search history.

(56) References Cited

U.S. PATENT DOCUMENTS

| 9,657,554 | B2 | 5/2017 | Morton et al. |
| 10,030,485 | B2 | 7/2018 | Gourmelon |
| 10,082,014 | B2 | 9/2018 | Fielder et al. |
| 10,309,209 | B2 * | 6/2019 | Caballero ............... E21B 43/08 |
| 10,641,066 | B2 * | 5/2020 | Mericas ................. E21B 43/08 |
| 10,689,964 | B2 * | 6/2020 | Saponja ................. E21B 43/38 |

* cited by examiner

*Primary Examiner* — Nicole Coy
(74) *Attorney, Agent, or Firm* — Tumey L.L.P.

(57) ABSTRACT

An apparatus and method for trapping particles disposed in a fluid. The apparatus may comprise one or more cavities disposed axially along a length of a tubular housing, one or more connecting components disposed at opposing ends of the housing, and may optionally comprise a check valve system. Alternate embodiments are provided for forming each of the one or more cavities, which may comprise a combination of a cavity frame and cavity surface. The method may comprise flowing a fluid into a first end of a particle trap apparatus at a rate of fluid flow, directing the fluid flow at least partially through one or more cavity sub-assemblies disposed in the particle trap apparatus, collecting the particulate matter in one or more of the cavity sub-assemblies when the rate of fluid flow may slow or become suspended, and clearing collected particles from the one or more cavity sub-assemblies upon restoration of fluid flow in a primary direction of travel.

15 Claims, 11 Drawing Sheets

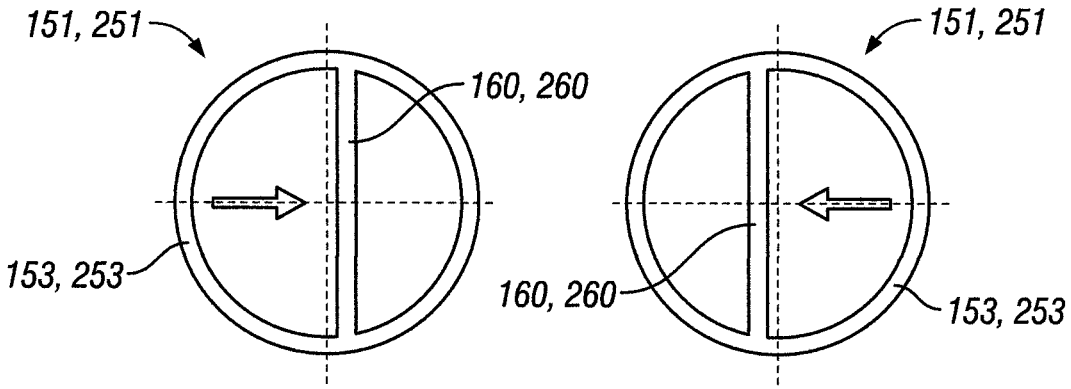
FIG. 10A  FIG. 10B
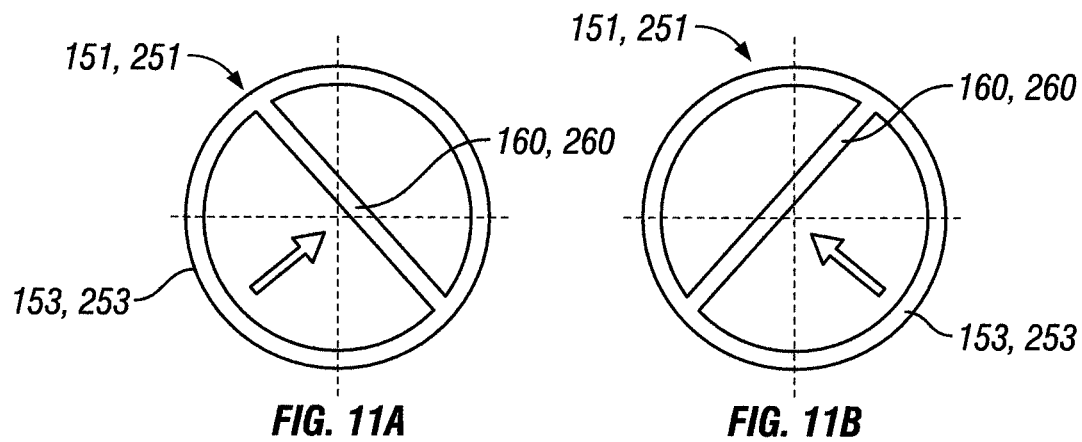
FIG. 11A  FIG. 11B
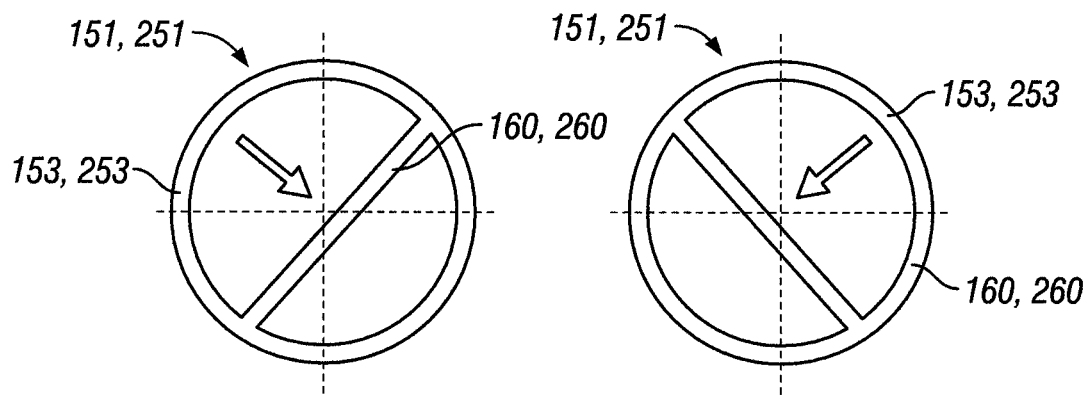
FIG. 11C  FIG. 11D

PARTICLE TRAP APPARATUS AND METHOD

CROSS-REFERENCE TO RELATED APPLICATIONS

This application claims priority to U.S. Provisional Application Ser. No. 63/177,248 filed Apr. 20, 2021, the entire contents of which is incorporated herein by reference thereto.

STATEMENT REGARDING FEDERALLY SPONSORED RESEARCH OR DEVELOPMENT

Not applicable.

BACKGROUND OF THE INVENTION

Field of the Invention

The present application relates generally to methods and apparatuses for collecting particulate matter disposed in fluids.

Background of the Invention

Filtering devices used to trap particles in a fluid are known in the art, and are employed across a range of industries and applications. Often such filtering devices may provide a desirable means of preventing particle build-up from detrimentally affecting the operation of mechanical or powered equipment. In particular, where the flow of a fluid may be modulated, cyclical, irregular, begin to slow, or stop for limited or extended durations, providing a means of trapping particles suspended in the fluid in a manner such that they are held separate from such equipment may present a number of benefits to the service live of the equipment, as well as the economics of operating the systems or processes in which they may be utilized.

For example, in the oil and gas industry, artificial lift devices may be deployed in a well in order to enhance the productions characteristics of the well. Although sucker-rod pumping mechanisms have been widely used in the past, increasingly oil and gas companies are investing capital in electronic submersible pumps (ESPs) as a means of supplementing or enhancing a reservoir's natural rate of production. Often, the wellbore fluid may include foreign particulate matter, especially in wells where proppant flow-back or other sand control issues may be prominent. Under certain circumstances, for example during power fluctuations relating to prevailing electricity reliability issues of an area local to the well, the ESP may cycle off or shut down, and the particulate matter present in the wellbore fluid may settle on the pump as the flow from the pump is reduced or halted. As a result the particulate matter, which may take the form of sand, proppant, or other wellbore particles, may collect and may inhibit or prevent the pump from being restarted, or may contribute to damaging the pump, which can be expensive to replace in terms of material, labor, and lost production. Similar detrimental effects may be incurred by alternative artificial lift equipment such as gas lift devices.

Locating a particle trap up-hole from the ESP may substantially improve the reliability, and economic performance of producing wellbores. However, current particle trap designs typically impede the flow of the fluid by requiring the fluid direction to be diverted at angles perpendicular or greater than perpendicular to the desired direction of flow. Often referred to as "pipe-in-pipe" devices, examples of such systems include those disclosed in U.S. Pat. No. 10,082,014 to Fletcher et al., U.S. Pat. No. 10,030,485 to Gourmelon, and U.S. Pat. No. 9,657,554 to Morton et al., the entire contents of which are incorporated herein by reference thereto.

Consequently, there is a need for an apparatus and method of trapping particles in a fluid which does not divert the direction of the flow of the fluid substantially from a desired, intended, or designed primary direction of fluid flow.

BRIEF SUMMARY OF SOME OF THE PREFERRED EMBODIMENTS

It is broadly one object of the present invention to provide an apparatus and method for trapping particles disposed in a fluid, wherein the direction of fluid flow through the apparatus may not substantially be diverted relative to an intended or desired direction of fluid flow at the input of the apparatus or the output of the apparatus.

It is another object of the present invention to provide an apparatus and method for trapping particles disposed in a fluid wherein the apparatus may comprise few or no moving parts.

It is another object of the present invention to provide an apparatus and method for trapping particles disposed in a fluid wherein the apparatus may be self-cleaning.

It is another object of the present invention to provide an apparatus and method for trapping particles disposed in a fluid, wherein the capacity of the apparatus may be fitted to the desired application in a cost-effective manner.

These and other needs in the art are addressed by a particle trap comprising one or more cavities disposed axially along a length of a tubular housing which allow fluid to flow through the particle trap without substantially deviating from a direction of fluid flow through an input to the particle trap. Alternate embodiments are provided for forming each of the one or more cavities, which may comprise a combination of a cavity frame and cavity surface. The cavities may be varied in size, shape, and quantity, and may be selected to provide a desired volume of trapping suitable for an intended application. The cavities may have one or more apertures disposed about a surface forming the cavity which may allow fluid to flow through the cavity generally parallel to the direction of fluid flow at the input of the particle trap. The apertures may be varied in size, shape, and quantity, and may be selected to fit a desired application. The particle trap may comprise one or more connecting components disposed at opposing ends of the tubular housing, and may further comprise a check-valve system to prevent back-flow through the particle trap.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other embodiments for carrying out the same purposes of the present invention. It should also be realized by those skilled in the art that such equivalent embodiments do not depart from the spirit and scope of the invention as set forth in the appended claims.

BRIEF DESCRIPTION OF THE DRAWINGS

For a detailed description of the preferred embodiments of the invention, reference will now be made to the accompanying drawings in which:

FIG. 10a illustrates a cross sectional view of an embodiment of a particle trap cavity profile having a first eclipsed area;

FIG. 10b illustrates a cross sectional view of an embodiment of a particle trap cavity profile having a second eclipsed area;

FIG. 11a illustrates a cross sectional view of an embodiment of a particle trap cavity profile in a first radial orientation;

FIG. 11b illustrates a cross sectional view of an embodiment of a particle trap cavity profile in a second radial orientation;

FIG. 11c illustrates a cross sectional view of an embodiment of a particle trap cavity profile in a third radial orientation;

FIG. 11d illustrates a cross sectional view of an embodiment of a particle trap cavity profile in a fourth radial orientation;

DETAILED DESCRIPTION OF THE PREFERRED EMBODIMENTS

In the descriptions that follow, the term "first" will refer generally to a portion of an apparatus, component, or sub-component which may be located relative to, associated with, or facing an upstream direction of a desired, intended, or designed primary direction of fluid flow, and the term "second" will refer generally to a portion of an apparatus, component, or sub-component which may be located relative to, associated with, or facing a downstream direction of a desired, intended, or designed primary direction of fluid flow. Under operational conditions, a rate of fluid flow may fall below a desired level or become modulated, cyclical, irregular, or suspended, potentially causing the direction of fluid flow to temporarily deviate or reverse from a desired, intended, or designed primary direction of fluid flow, however in the description that follows the terms "first" and "second" are to be understood as being in relation to the intended, desired, or designed primary direction of flow.

Figure 1:
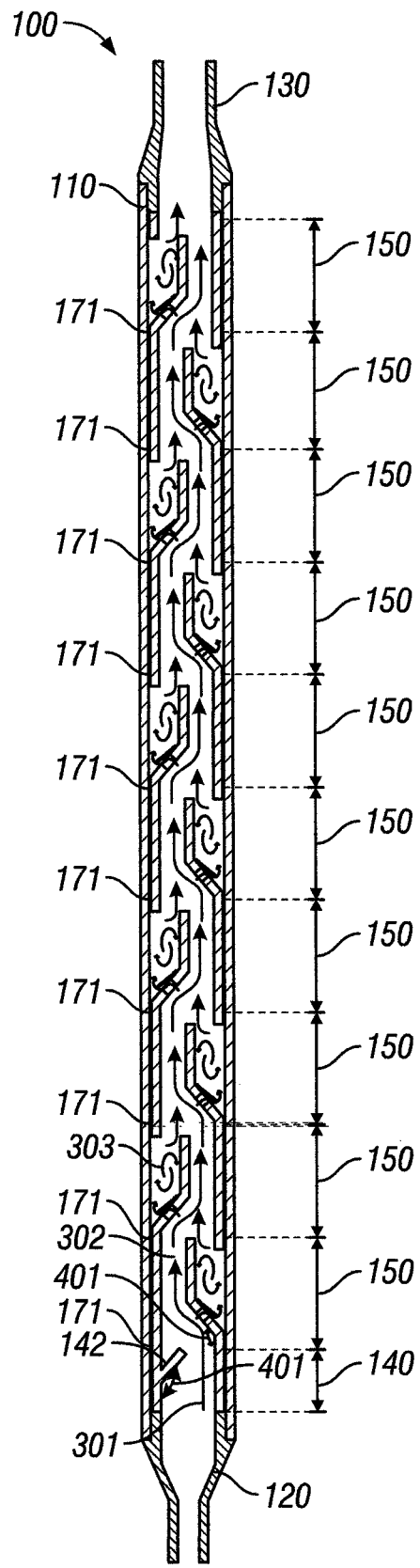
FIG. 1 illustrates a first embodiment of a particle trap showing a primary fluid flow.
Figure 2:
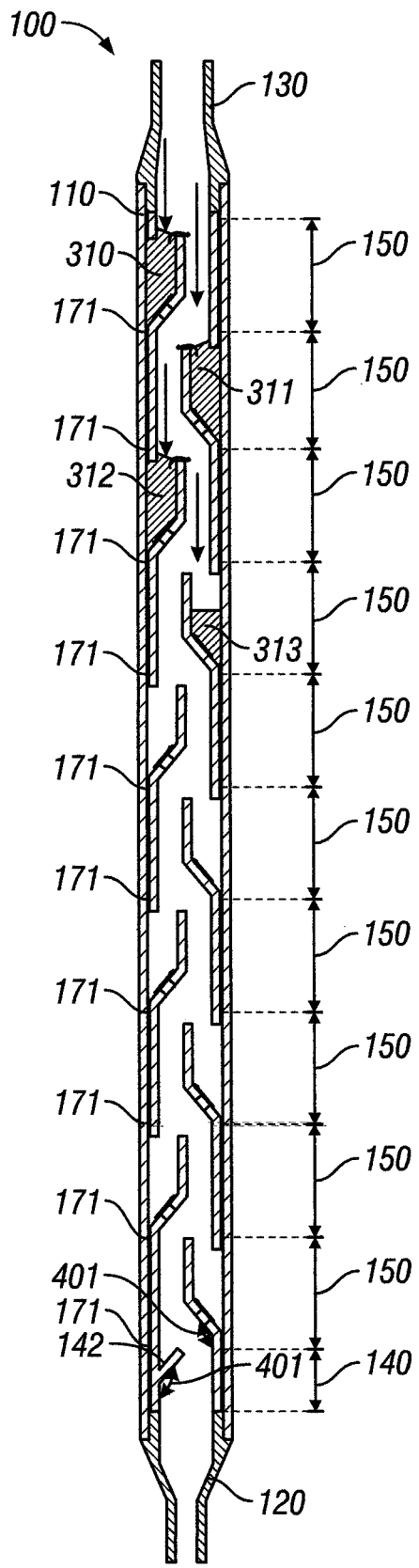
FIG. 2 illustrates a first embodiment of a particle trap showing a suspended fluid flow and debris fallback.
Figure 7:
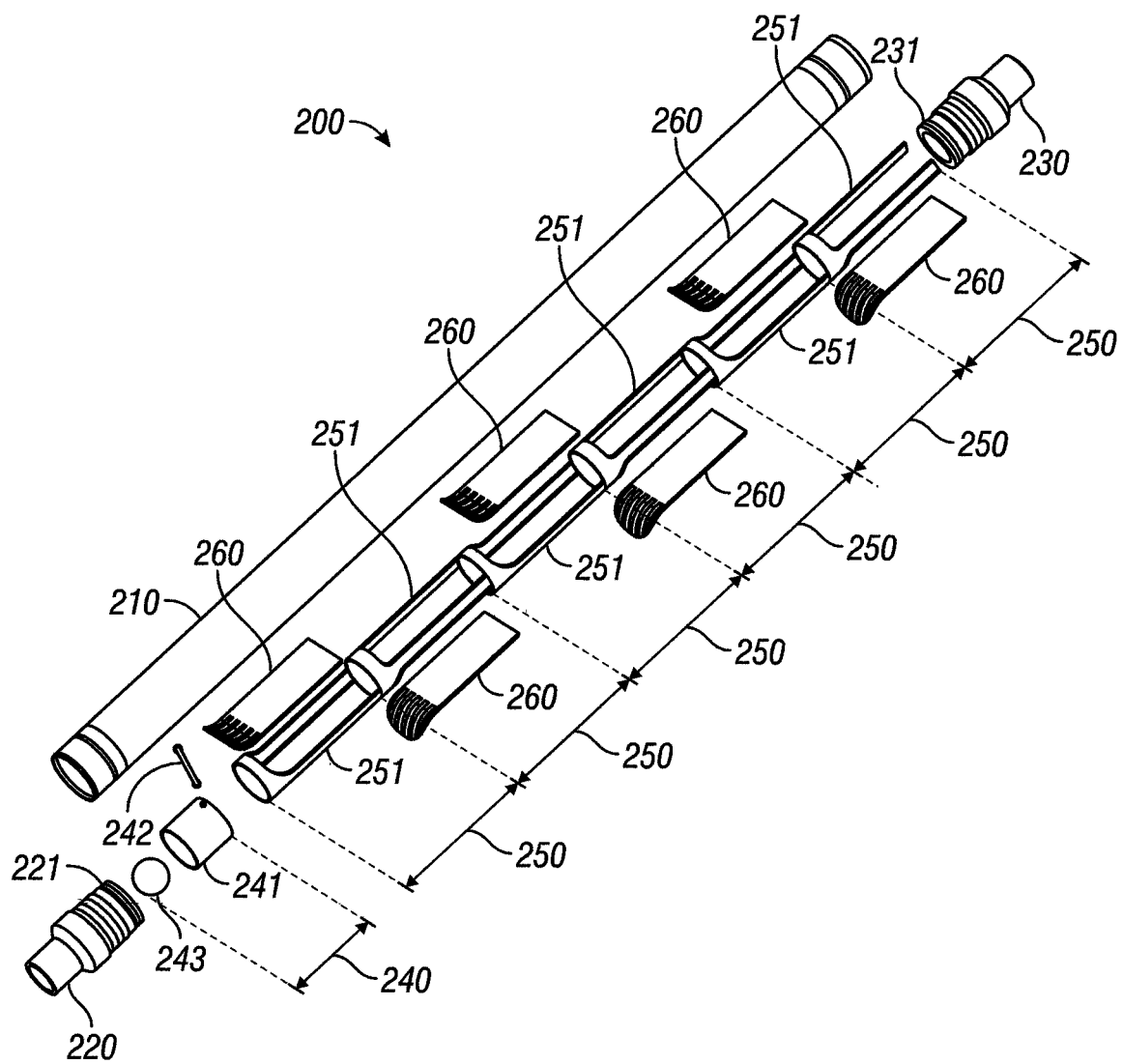
FIG. 7 illustrates an exploded view of a second embodiment of a particle trap.

FIGS. 1 and 2 illustrate a first embodiment of a particle trap apparatus, particle trap 100, under alternate operational conditions, with FIG. 1 depicting an intended, desired, or designed primary direction of fluid flow through particle trap 100, and FIG. 2 depicting the primary fluid flow suspended, and particles which may be disposed in the fluid becoming trapped by particle trap 100. As illustrated, the primary direction of fluid flow through particle trap 100 will be from bottom to top. FIG. 7 illustrates an exploded view of a second embodiment of a particle trap apparatus, particle trap 200. Although no such primary direction of fluid flow is illustrated in FIG. 7, the primary direction of fluid flow through particle trap 200 will be from left to right. A detailed description of the patterns of fluid flow through particle trap 100,200, and the methods through which particles disposed in the fluid may be trapped by particle trap 100,200, will be provided after first providing a detailed description of the individual components of particle trap 100,200.

Referring to FIGS. 1, 2, and 7, particle trap 100,200 may comprise housing 110,210, connection component 120,220 disposed at a first end of housing 110,210, connection component 130,230 disposed at a second end of housing 110,210, and one or more cavity sub-assemblies 150,250 arranged longitudinally along a central axis of particle trap 100,200. In embodiments, the quantity of the one or more cavity sub-assemblies 150,250 which may be disposed within particle trap 100,200 may be determined or selected based upon a capacity of an individual cavity sub-assembly 150,250 and an anticipated volume of particles which may settle if flow through particle trap assembly 100,200 slows, becomes suspended, or reverses for an anticipated duration under operational conditions which may cause debris fallback. In the first embodiment, particle trap 100 may further comprise at least one flow initiator sub-assembly 140 disposed about a first end of housing 110 and abutting a first cavity sub-assembly 150. In the second embodiment, particle trap 200 may further comprise at least one check valve sub-assembly 240 disposed about a first end of housing 210 and abutting a first cavity sub-assembly 250. Particle trap 100,200 may further comprise one or more sealing elements which may be located between connection component 120, 220, flow initiator sub-assembly 140 (in the first embodiment) or check valve sub-assembly 240 (in the second embodiment), each of the one or more cavity sub-assemblies 150,250, and connection component 130,230.

Housing 110,210 may be generally tubular in shape, and may be formed having a first end and second end adapted to receive connection components 120,220 and 130,230, respectively. The axial length of housing 110,210 may be selected to accommodate the combined length of the one or more cavity sub-assemblies 150,250 to be disposed in particle trap 100,200, and may include additional length to accommodate flow initiator sub-assembly 140 (in the first embodiment) or check valve sub-assembly 240 (in the second embodiment) and connection to each of the connection components 120,220 and 130,230. The external diameter of housing 110,210 may be any diameter suitable for the application for which particle trap assembly 100,200 may be intended, and the internal diameter of housing 110,210 may be any diameter suitable to accommodate the one or more cavity sub-assemblies 150,250 and flow initiator sub-assembly 140 (in the first embodiment) or valve sub-assembly 240 (in the second embodiment). The wall thickness of housing 110,210 may be any thickness suitable for the application for which particle trap assembly 100,200 may be intended, and may be selected based upon an anticipated fluid pressure or hoop stress which may be encountered in the application for which particle trap assembly 100,200 may be intended. Housing 110,210 may be rigid, non-rigid, flexible, or articulated, and may be formed from any material suitable for the application for which particle trap 100,200 may be intended. In embodiments, housing 110,210 may be formed from metallic materials such as steel, stainless steel, aluminum, copper, titanium, or other such metals, or from non-metallic materials such as plastic, rubber, fiber reinforced rubber, composite, biodegradable, erosion-resistant, or medical-grade materials, or any combinations thereof. The inner or outer surface of housing 110,210 may comprise any suitable finish, for example, housing 110,210 may be formed having an inner or outer surface finish which is smooth. In embodiments, the first and second ends of housing 110,210 may be formed having any known connection type suitably adapted to receive and secure connection components 120,220 and 130,230, respectively. For example, the first and/or second end of housing 110,210 may be formed having an internally threaded profile which may be adapted to receive connection components 120,220 and 130,230, respectively.

Connection components 120,220 and 130,230 may be formed having a reduced diameter portion adapted to be received into a first end and/or second end of housing 110,210 respectively. In embodiments, connection components 120,220 and 130,230 may be the same, similar, or dissimilar in shape, profile, material, finish, or connection type, and may be formed to allow particle trap assembly 100,200 to be connected into the application for which particle trap assembly 100,200 may be intended through any known connection type, for example threaded connection, slip connection, stepped-connection, or compression-fit connection. Connection components 120,220 and 130,230 may be formed from any material suitable for the application for which particle trap assembly 100,200 may be intended. In embodiments, connection components 120,220 and 130,230 may be formed from metallic materials such as steel, stainless steel, aluminum, copper, titanium, or other such metals, or from non-metallic materials such as plastic, rubber, fiber reinforced rubber, composite, biodegradable, erosion-resistant, or medical-grade materials, or any combinations thereof. The inner surface of connection components 120, 220 and 130,230 may comprise any suitable finish, for example, connection components 120,220 and 130,230 may be formed having an inner surface finish which is smooth. Connection component 120 may be formed having an internal shoulder at its second end which may abut a first end of flow initiator sub-assembly 140 (in the first embodiment) or check valve sub-assembly 240 (in the second embodiment). Similarly, connection component 130,230 may be formed having an internal shoulder at its first end which may abut a second end of cavity sub-assembly 150,250 when disposed in particle trap 100,200. In the second embodiment, connection component 220 may further be formed having an inner profile compatible with, or functionally integrated with check valve sub-assembly 240. For example, a second end of connection component 220 may be formed having a ball seat adapted to receive a ball check valve system.

Connection component 120,220 and 130,230 may be provided with one or more connection seals 121,221 and 131,231, respectively. In embodiments, connection seals 121,221 and 131,231 may be located in a recessed outer profile of a reduced diameter portion of connection component 120,220 and 130,230, respectively, suitable to be received by housing 110,210, or may be integrated with or applied to a surface of connection component 120,220 and 130,230, respectively, to provide a seal against housing 110,210. For example, in embodiments comprising a threaded connection between connection component 120, 220 and housing 110,210, connection seal 121,221 may be located downstream from the threaded connection, internal to particle trap 100,200. Similarly, in embodiments comprising a threaded connection between connection component 130,230 and housing 110,210, connection seal 131,231 may be located upstream from the threaded connection, internal to particle trap 100,200. Connection seals 121,221 and 131,231 may be any type of seal, and may be formed from any material suitable for the application far which particle trap assembly 100 may be intended. For example, connection seals 121,221 and 131,231 may be an O-ring seal, thread seal, or Loctite® seal.

In the first embodiment, flow initiator sub-assembly 140 may comprise spacer 141 and flow initiator 142. Spacer 141 may be disposed about the first end of housing 110, with a first end of spacer 141 abutting connection component 120 and a second end of spacer 141 abutting a first end of a first cavity sub-assembly 150. Spacer 141 may be formed having an outer diameter, inner diameter, wall thickness, and surface finish similar to or the same as a second end of connection component 120 or a first end of a first cavity sub-assembly 150, and may provide an internal surface which transitions between the internal surface of connection component 120 and the internal surface of cavity sub-assembly 150. Spacer 141 may be formed from any suitable material, for example, spacer 141 may be formed from a material the same as or similar to cavity sub-assembly 150. Spacer 141 may be provided with an aperture, slot, or internal profile adapted to receive flow initiator 142. Flow initiator 142 may be formed to provide a surface of first encounter for fluid flowing in the primary direction of flow through particle trap 100, and may be formed from a material the same as or similar to surface 160 of cavity sub assembly 150. In embodiments, flow initiator 142 may be formed having a general design, size, shape, or profile the same as, similar to, or complimentary to an upstream portion of surface 160 of cavity sub-assembly 150, and may be disposed in spacer 141 in a manner complimentary to an upstream portion of surface 160 so as to initiate a desired pattern of fluid flow in the primary direction through particle trap 100. For example, referring to FIG. 1, flow initiator 142 may be disposed in spacer 141 having an angle of longitudinal orientation 401 the same as, or similar to an upstream portion of surface 160, and an axial orientation offset from that of surface 160 of a first cavity sub-assembly 150. Similarly, flow initiator 142 may be spaced a longitudinal distance from an adjacent upstream surface 160 the same as, or similar to a longitudinal distance between two of a plurality of upstream surfaces 160. In this manner, flow initiator 142 may induce a circulating or oscillatory flow pattern as illustrated in FIG. 1.

In the second embodiment, particle trap 200 may comprise one or more check valve systems. In embodiments, check valve sub-assembly 240 may be disposed about a first end of housing 210 and may be disposed between connection component 220 and a first end of a first cavity sub-assembly 250. Check valve sub-assembly 240 may be any suitable check-valve system known in the art. For example, check valve sub-assembly 240 may comprise a ball check valve, a stop-check valve, a swing check valve, a lift check valve, and in-line check valve, a tilting disc (or "flapper") check valve, a diaphragm check valve, a duckbill check valve, a pneumatic non-return check valve, or other suitable check valve systems known in the art.

In embodiments comprising a ball-check valve assembly as illustrated in FIG. 7, check valve sub-assembly 240 may comprise spacer 241, retainer 242, and ball 243, with connection component 220 disposed at the first end of housing 210 being formed having a ball-seat adapted to receive ball 243. Spacer 241 may be disposed about the first end of housing 210, with a first end of spacer 241 abutting connection component 220 and a second end of spacer 241 abutting a first end of a first cavity sub-assembly 250. Spacer 241 may be formed having an outer diameter, inner diameter, wall thickness, and surface finish similar to or the same as a second end of connection component 220 or a first end of a first cavity sub-assembly 250, and may provide an internal surface which transitions between the internal surface of connection component 120 and the internal surface of cavity sub-assembly 250. Spacer 241 may be formed from any suitable material, for example, spacer 241 may be formed from a material the same as or similar to cavity sub-assembly 250. Spacer 241 may be formed in such a manner to secure retainer 242 in a position which restricts the travel of ball 243 to prevent interference with a first cavity sub-assembly 250 disposed toward the first end of housing 210. Retainer 242 may be formed having any suitable size, shape, or profile which may restrict the movement of ball 243 to prevent ball 243 from interfering with a first cavity sub-assembly 250, for example retainer 242 may be a retaining pin. Retainer 242 may be held in place through any suitable means, for example retainer 242 may be secured via threaded connection to spacer 241 or may be fitted within one or more apertures formed in spacer 241 which are adapted to receive retainer 242. In alternate embodiments, retainer 242 may be joined to spacer 241, for example by welding, brazing, soldering, or the like. In other embodiments, retainer 242 may be formed as part of spacer 241, for example retainer 242 may comprise a raised or deviated internal profile of spacer 241.

Figure 3:
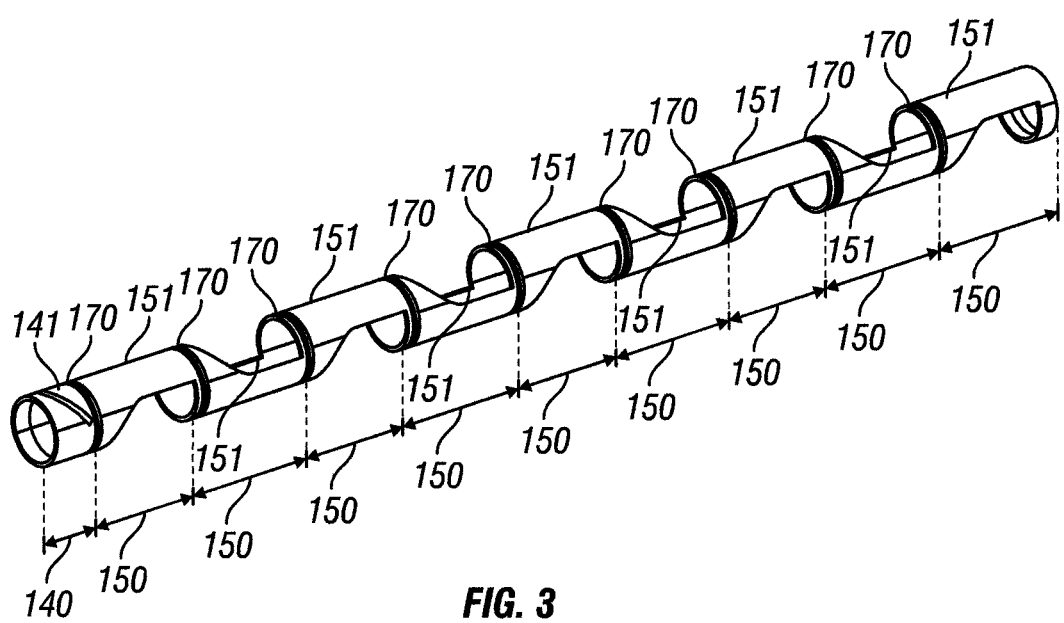
FIG. 3 illustrates a flow initiator spacer and a plurality of cavity sub-assembly frames of a first embodiment a particle trap.
Figure 4A:
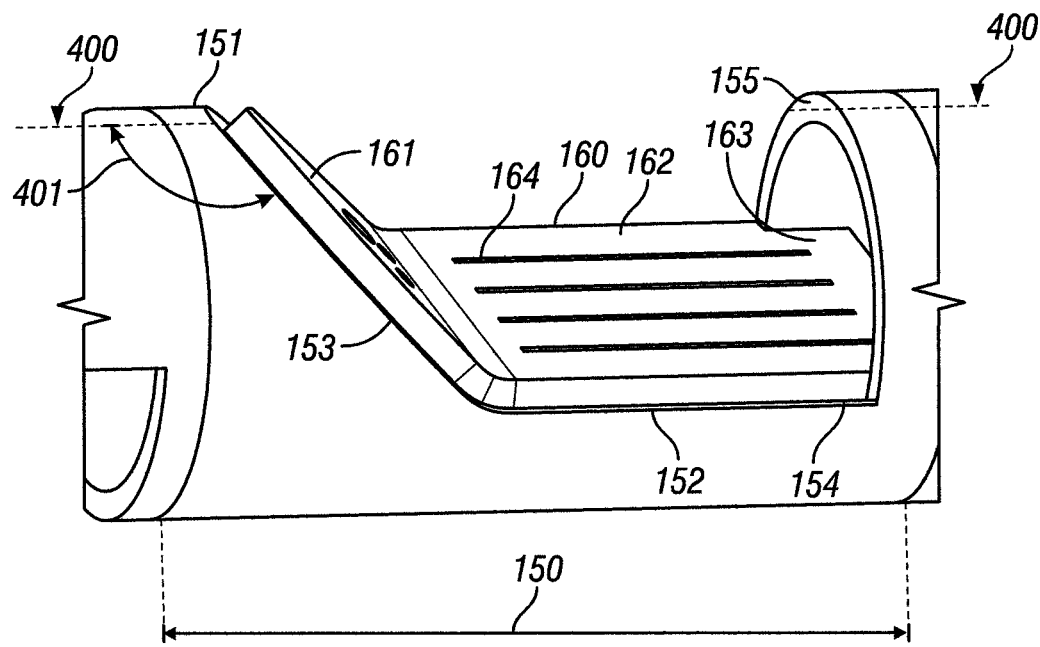
FIG. 4a illustrates a first perspective view of a cavity sub-assembly of a first embodiment of a particle trap.
Figure 4B:
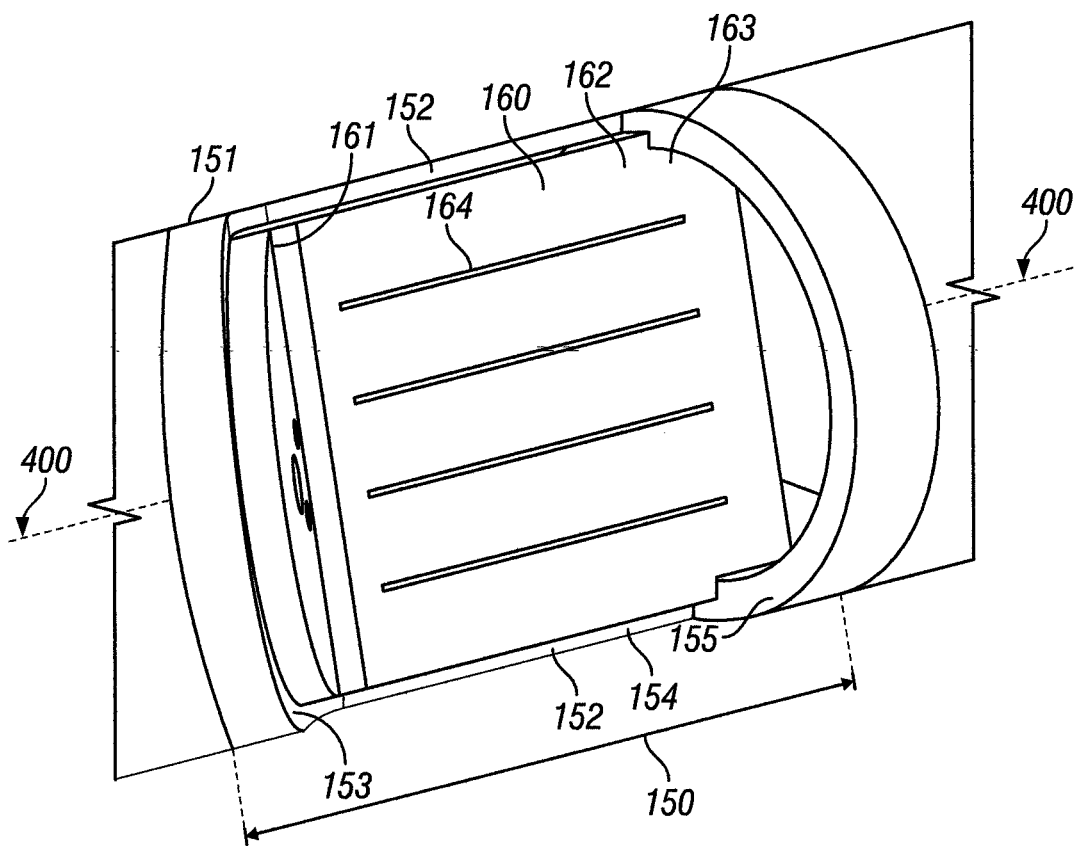
FIG. 4b illustrates a second perspective view of a cavity sub-assembly of a first embodiment of a particle trap.
Figure 8A:
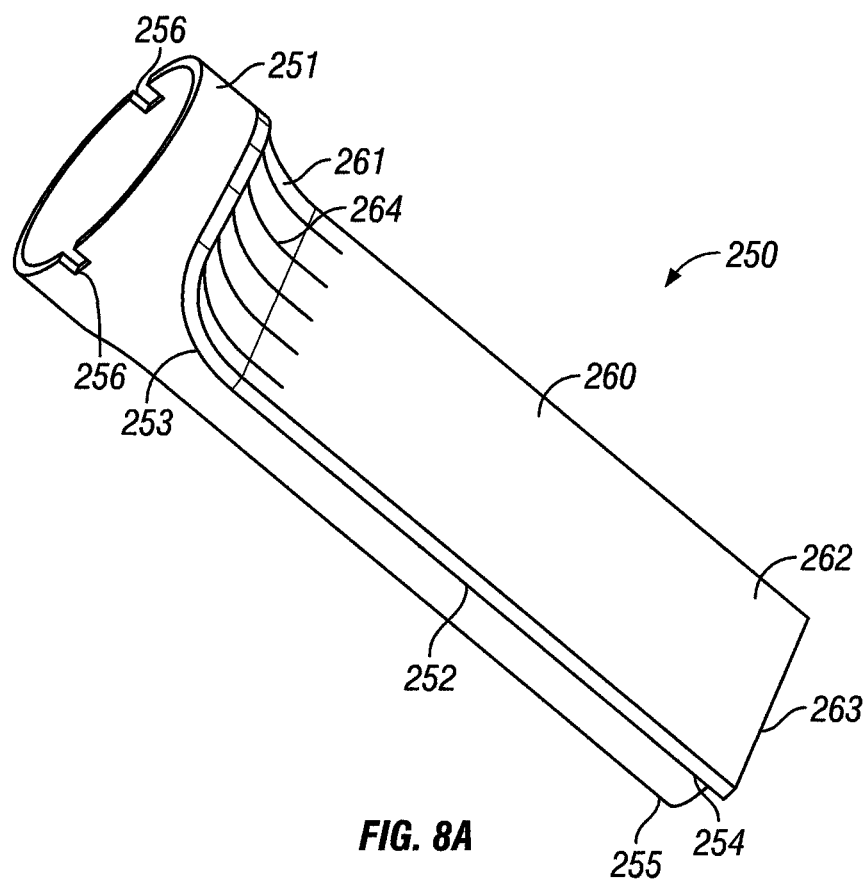
FIG. 8a illustrates a first perspective view of a cavity sub-assembly of a second embodiment of a particle trap.
Figure 8B:
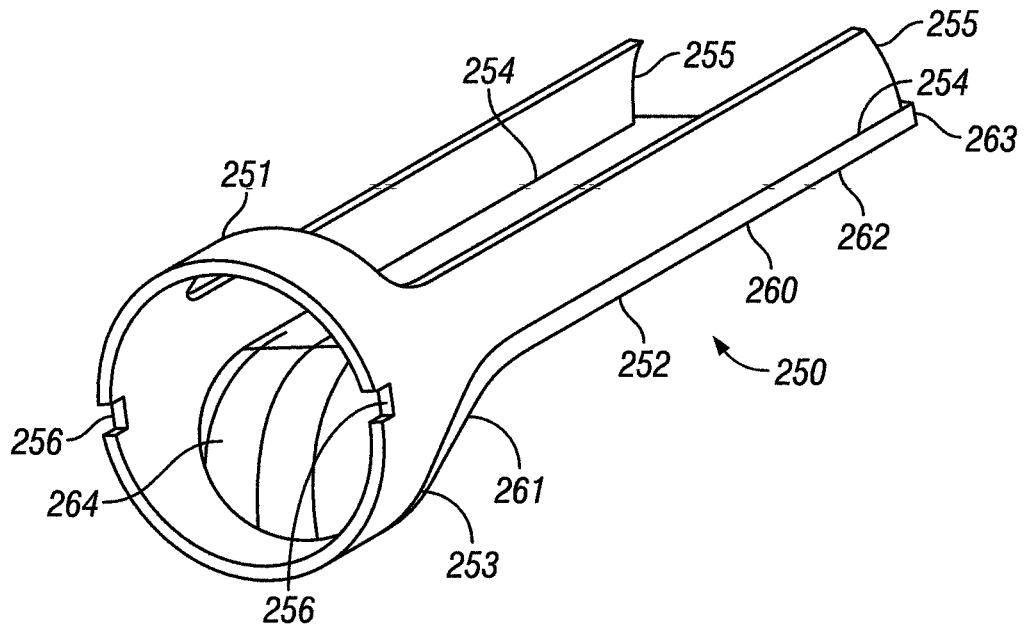
FIG. 8b illustrates a second perspective view of a cavity sub-assembly of a second embodiment of a particle trap.

FIGS. 3 and 4a-b illustrate cavity sub-assembly 150, which may be suitable for use in particle trap 100. FIGS. 7 and 8a-c illustrate cavity sub-assembly 250, which may be suitable for use in particle trap 200. Each of the one or more cavities 150,250 may comprise a portion of cavity frame 151,251 and cavity surface 160,260, wherein each cavity surface 160,260 may further be provided with one or more check valve assemblies as illustrated in FIGS. 5a-b and 6a-b. In embodiments of particle trap 100,200, the cavity frame 151,251 corresponding to each of the one or more cavity sub-assemblies 150,250 may be formed individually, as shown in FIGS. 8a-b, while in alternate embodiments of particle trap 100,200 as shown in FIG. 7, a frame providing a plurality of such cavities may be formed from a single tubular member.

Cavity frame 151,251 may be generally tubular in cross-section, having an outside diameter corresponding to an inside diameter of housing 110,210, and may be formed having a length and wall thickness suitable to structurally support cavity surface 160,260. Cavity frame 151,251 may be formed from any material suitable for the application for which particle trap assembly 100,200 may be intended. In embodiments, cavity frame 151,251 may be formed from metallic materials such as steel, stainless steel, aluminum, copper, titanium, or other such metals, or from non-metallic materials such as plastic, rubber, fiber reinforced rubber, composite, biodegradable, erosion-resistant, or medical-grade materials, or any combinations thereof.

In the first embodiment, illustrated in FIGS. 4a-b, cavity frame 151 may be provided with cavity profile 152 which may be adapted to receive and provide support for cavity surface 160. Cavity profile 152 may comprise one or more frame surfaces which may include upstream portion 153, longitudinal portion 154, and downstream portion 155, which may result from a portion of the base tubular having been removed to form cavity profile 152. Cavity profile upstream portion 153 may be formed at angle 401 from longitudinal reference line 400 following lengthwise along an outer surface of frame 151 of particle trap 100, and may extend to or past a cross-sectional centerline of cavity frame 151 of particle trap 100, as illustrated in FIGS. 10a-b. In embodiments, angle 401 may be any suitable angle between about 90 degrees and about 180 degrees which may encourage a circulating or oscillatory flow pattern as illustrated in FIG. 1. For example, in some embodiments, angle 401 may be between about 112.5 and about 157.5 degrees. In other embodiments, angle 401 may be between about 90 degrees and about 135 degrees, and in further embodiments, angle 401 may be between about 135 degrees and about 180 degrees. Cavity profile longitudinal portion 154 may be generally parallel to an axial centerline of cavity frame 151, and may be any length which in combination with cavity profile upstream portion 153 may provide cavity profile 152 with a desired volume suitable for trapping particles in the application for which particle trap 100 may be intended. Cavity profile downstream portion 155 may be formed at any suitable angle from longitudinal reference line 400, for example, cavity profile downstream portion 155 may be perpendicular to longitudinal reference line 400. The first and second ends of cavity frame 151 may further be provided with a recessed outer profile 170, shown in FIGS. 3, 5a-b, and 6a-b, adapted to receive one or more seals 171, shown in FIGS. 1 and 2, which may be disposed between adjacent cavity frames 151, or between cavity frame 151 and flow initiator spacer 141, thereby individually sealing each cavity and preventing fluid flow in any annular cavity which may be formed between an inner surface of housing 110 and the outer surface of the one or more cavity frames 151 or flow initiator spacer 141.

Figure 8C:
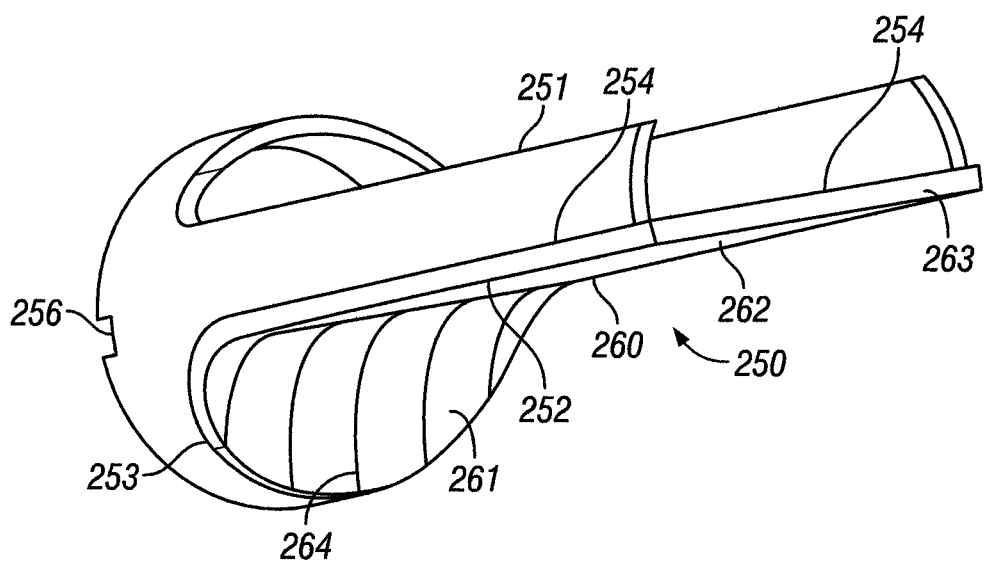
FIG. 8c illustrates a third perspective view of a cavity sub-assembly of a second embodiment of a particle trap.

In the second embodiment, illustrated in FIGS. 8a-c, cavity frame 251 may be formed to comprise one or more framing members extending in a longitudinal direction from a generally tubular first portion, and may form cavity profile 252. Cavity profile 252 may comprise one or more frame surfaces which may include upstream portion 253 and longitudinal portion 254. Cavity profile upstream portion 253 may be formed at an angle in a manner similar to first embodiment cavity profile upstream portion 153, or may blend into cavity profile longitudinal portion 254 as illustrated. Each surface 255 of a second end of cavity profile longitudinal portion 254 may be formed in a manner to abut a first surface of an adjacent cavity frame 251 when disposed in particle trap 200. Cavity frame 251 may further comprise one or more recessed profiles 256 disposed about a first end which are adapted to receive extended portion 263 at a second end of surface 260. In embodiments, a plurality of cavity sub-assemblies 250 may be axially stacked end-to-end, wherein recessed profile 256 of each cavity frame 251 receives extended portion 263 of an abutting cavity surface 260.

Figure 9A:
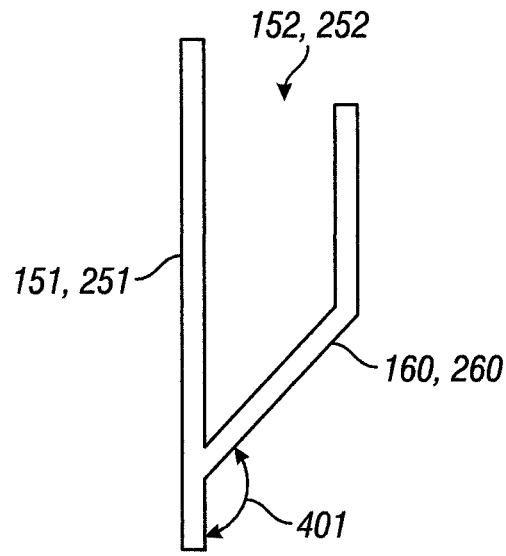
FIG. 9a illustrates an embodiment of an angled particle trap cavity profile.
Figure 9B:
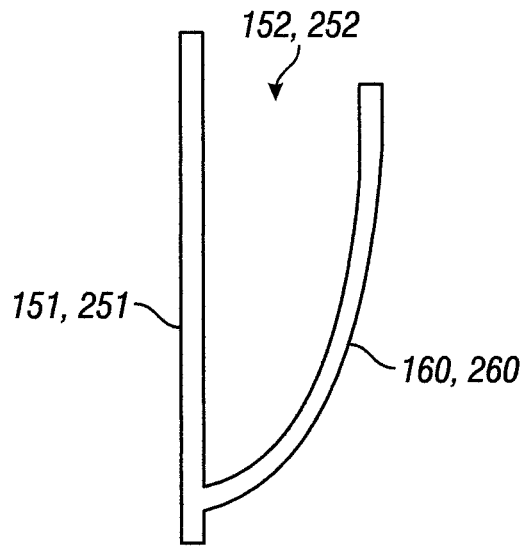
FIG. 9b illustrates an embodiment of a curved particle trap cavity profile.
Figure 9C:
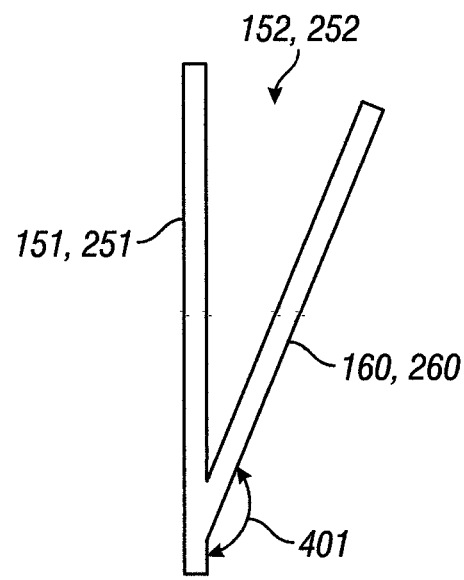
FIG. 9c illustrates an embodiment of a straight particle trap cavity profile.
Figure 9D:
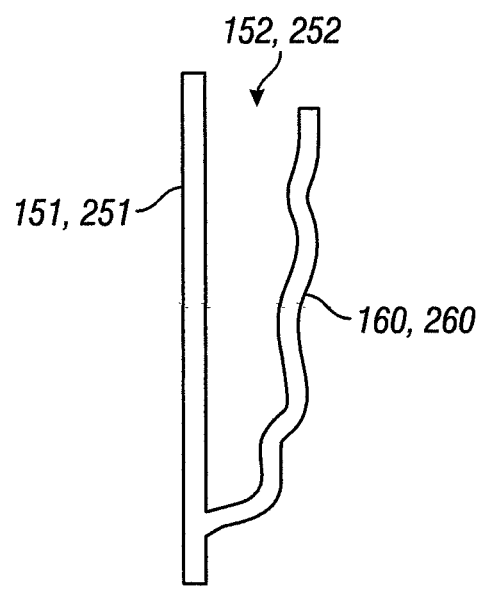
FIG. 9d illustrates an embodiment of a-non-rigid particle trap cavity profile.
Figure 12A:
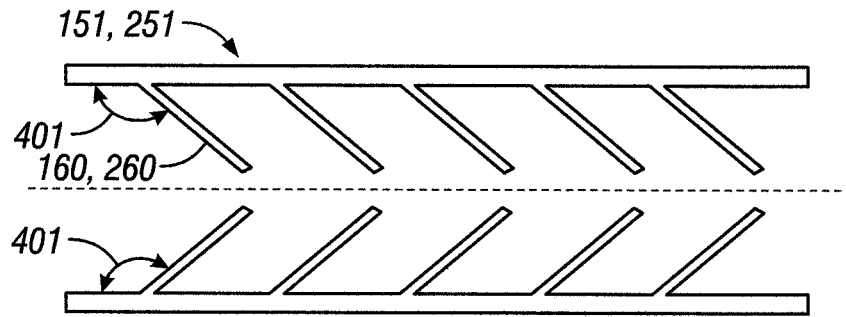
FIG. 12a illustrates a cut-away view of an embodiment of a particle trap having symmetrically disposed cavity profiles of the same size.
Figure 12B:
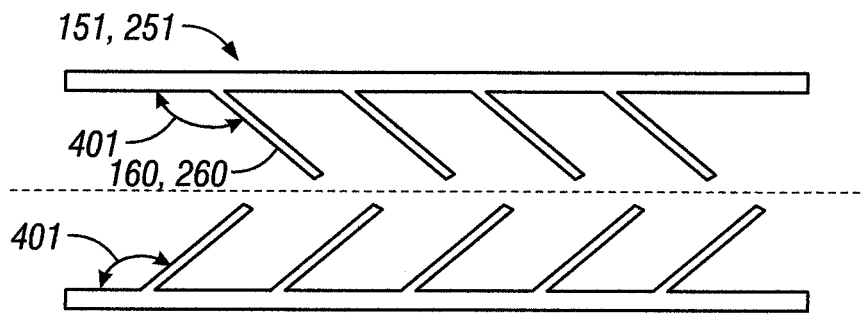
FIG. 12b illustrates a cut-away view of an embodiment of a particle trap having alternatingly disposed cavity profiles of the same size.
Figure 12C:
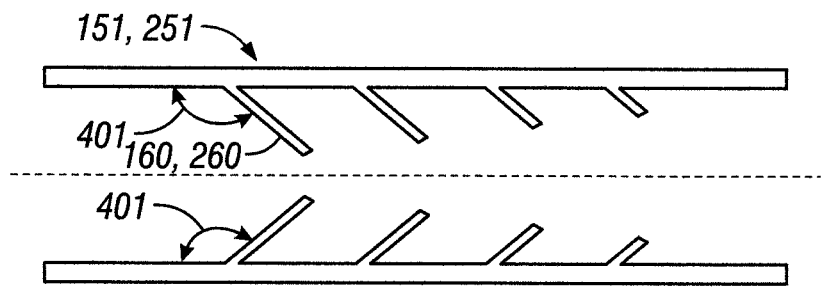
FIG. 12c illustrates a cut-away view of an embodiment of a particle trap having symmetrically disposed cavity profiles reducing in size.
Figure 12D:
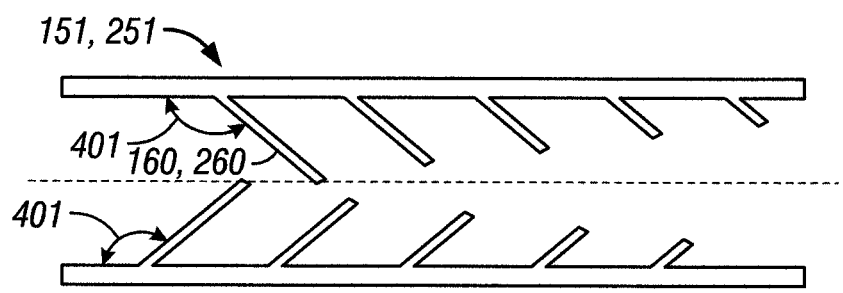
FIG. 12d illustrates a cut-away view of an embodiment of a particle trap having alternatingly disposed cavity profiles reducing in size.

Referring now to FIGS. 9a-d, 10a-b, and 11a-d, cavity profile 152,252 may be formed in a variety of shapes, sizes, side profiles, and radial and axial orientations. In embodiments, each of a plurality of cavity profiles 152,252 may have about a same, or similar shape, size, side profile, and may be spaced longitudinally apart from an adjacent cavity profile a same or similar distance as the spacing between any two cavity profiles 152,252 of the plurality. As illustrated in FIG. 9a-d, cavity profile 152,252 may be formed to be angled, curved, straight, or non-rigid, or combinations thereof. In embodiments where cavity profile 152,252 may be non-rigid, as shown in FIG. 9d, cavity surface 160,260 may contract or expand in response to a direction of flow, in a manner which may be similar to a collapsed umbrella forming pockets which may react to alternating flows of air across the collapsed portion. In such embodiments, a cavity surface 160,260 may be provided with one or more framing members which may themselves be flexible, rigid, or formed in a manner which may modulate based upon a flow of fluid across such a surface in alternating directions. As illustrated in FIGS. 10a-b, cavity profile 152,252 may be sized to eclipse greater than ½ of the cross sectional area of cavity frame 151,251. In embodiments, cavity sub-assemblies 150, 250 may be disposed in housing 110,210 having alternating orientations wherein the eclipsing of each cavity sub-assembly 150,250 overlaps a neighboring cavity sub-assembly 150,250 when viewed axially. As illustrated in FIGS. 11a-d, cavity sub-assembly 150,250 may be disposed in housing 110,210 in any radial orientation. In embodiments, a plurality of cavity sub-assemblies 150,250 may be disposed in housing 110,210 having varying radial orientations or in a progressive sequence which may induce a desired pattern of fluid flow through particle trap 100,200. As illustrated in FIGS. 12a-d, a plurality of cavity sub-assemblies 150,250 may be disposed about a central axis, and may further be disposed in configurations which may be aligned, as shown in FIGS. 12a and 12c, or alternating, as shown in FIGS. 12b and 12d. In alternate embodiments, each of the plurality of cavity sub-assemblies 150,250 may be the same or similar in size, as showing in FIGS. 12a and 12b, or may vary in size, as shown in FIGS. 12c and 12d. For example, the size of each of a plurality of bucket sub-assemblies disposed about a central axis may be reduced based on placement relative to a first end of the central axis, or vice-versa.

Cavity surface 160,260 may be formed having a size and shape complimentary to, and which may be fitted to, cavity profile upstream portion 153,253 and longitudinal portion 154,254, and may comprise upstream portion 161,261, longitudinal portion 162,262, and extended portion 163,263. In the first embodiment, as shown in FIGS. 4a-b, cavity surface extended portion 163 may be formed having a width the same as, or similar to, an internal diameter of cavity frame 151, and may provide a shoulder which may abut cavity profile downstream portion 155. In the second embodiment, as shown in FIGS. 8a-c, cavity surface extended portion 263 may extend beyond cavity frame longitudinal portion 254 in a size and shape which may be received by recessed profile 256 of an adjacently disposed cavity sub-assembly 250. Cavity surface may be formed having any thickness suitable for the application for which particle trap assembly 100,200 may be intended. In embodiments, cavity surface 160,260 may be formed from metallic materials such as steel, stainless steel, aluminum, copper, titanium, or other such metals, or from non-metallic materials such as plastic, rubber, fiber reinforced rubber, composite, biodegradable, erosion-resistant, or medical-grade materials, or any combinations thereof. Cavity surface 160,260 may be affixed to cavity frame 151,251 through any suitable method, for example, cavity surface 160,260 may be welded to cavity frame 151,251.

In embodiments, cavity surface 160,260 may be provided with one or more apertures 164,264 which may be disposed on upstream portion 161,261, longitudinal portion 162,262, or combinations thereof, and may be parallel to a longitudinal axis of particle trap 100,200 so as to not divert fluid flow away from or against a primary direction of flow. Each of the one or more apertures 164,264 may be varied in size, which may be selected to fit to a desired application. For example, the size may be selected based upon an anticipated dimensional aspect of a particle to be trapped, while also allowing a trapped particle to be lifted with a flow stream through the apertures 164,264. Each of the one or more apertures 164,264 may also be varied in shape. For example, each of the one or more apertures 164,264 may comprise a straight cut, a slot, or one or more holes of any desired shape, such as circular, square, rectangular, triangular, or combinations thereof. In alternate embodiments, all or a portion of cavity surface 160,260 may be formed from bridge slot screen. In such embodiments, the size and profile of the bridge slots may be selected based upon the application for which particle trap assembly 100,200 may be intended. In embodiments, the size and shape of apertures 164,264 may allow or encourage fluid flow through particle trap assembly 100,200 to remain generally parallel to the primary direction of fluid flow.

Cavity surface 160,260 may further comprise one or more check valve systems which may permit fluid flow through cavity surface 160,260 when fluid may flow through particle trap 100,200 in the primary direction. In embodiments, the one or more check valve systems may be any suitable check valve system which may be disposed about cavity surface 160,260, for example a flapper-type check valve, a ball-type check valve, a needle seat-type check valve, or a poppet-type check valve, and may be biased toward a closed configuration when fluid flow through particle trap 100,200 may become slowed, suspended, or reversed from the primary direction of fluid flow. Each of the one or more check valves may comprise one or more fluid apertures located about cavity surface 160,260 which may be sized to permit a desired rate of flow through cavity surface 160,260.

Figure 5A:
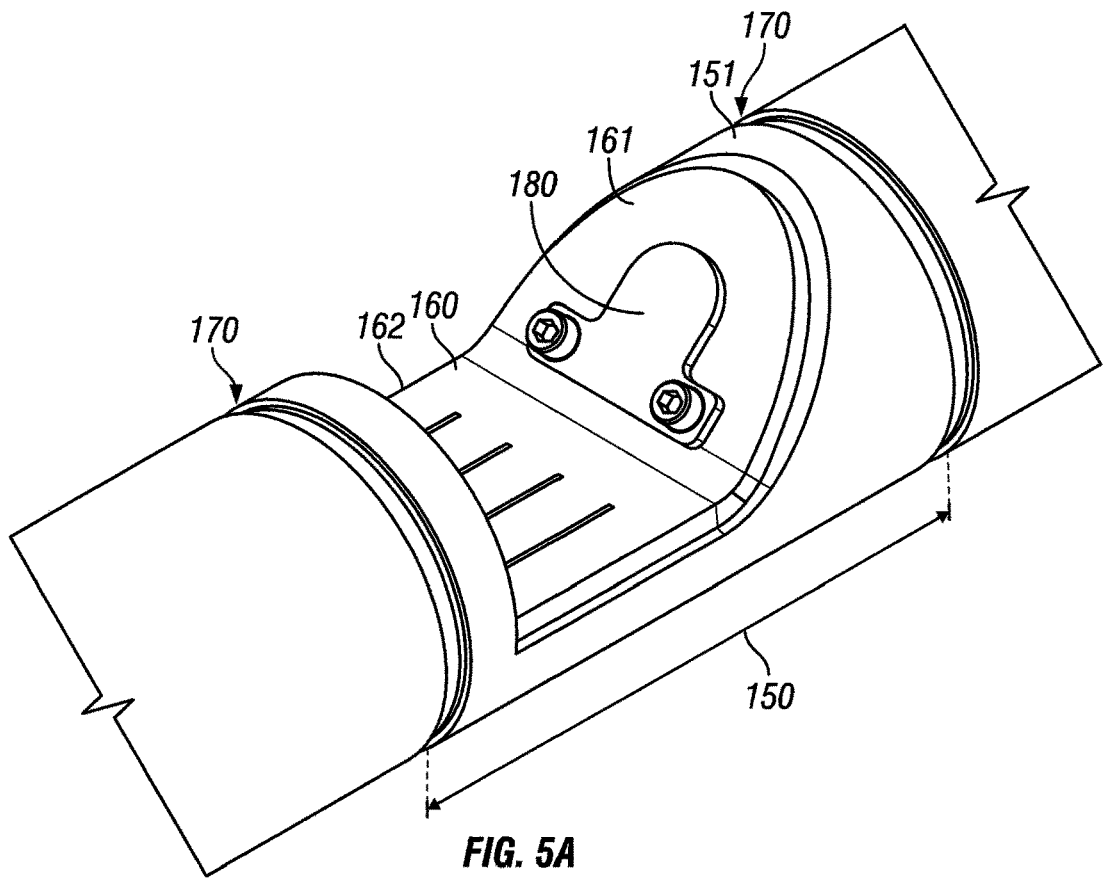
FIG. 5a illustrates an assembled view of an embodiment of a particle trap cavity flapper-type check valve.
Figure 5B:
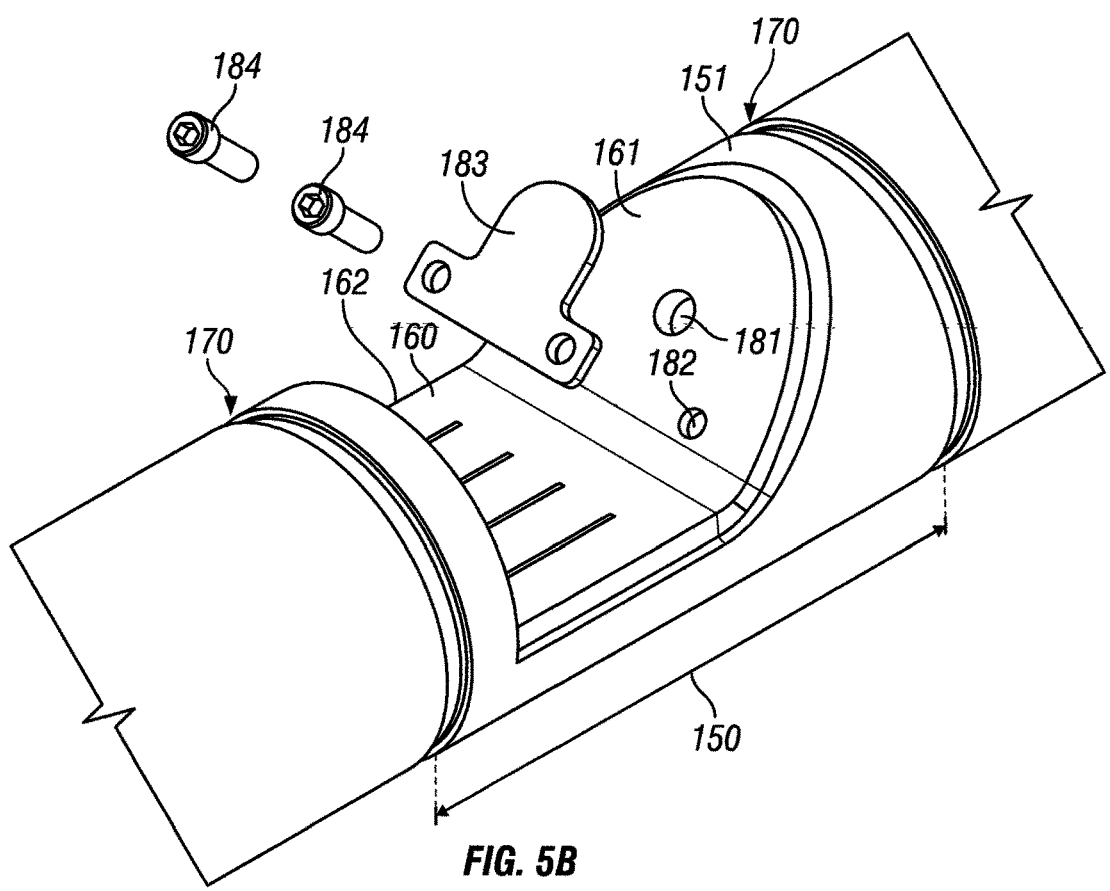
FIG. 5b illustrates an exploded view of an embodiment of a particle trap cavity flapper-type check valve.

FIGS. 5a-b illustrate an embodiment of a flapper-type check valve system 180, which may comprise fluid aperture 181 and one or more threaded apertures 182 located on cavity surface 160, flapper-type valve 183, and one or more threaded fasteners 184 corresponding to each of the one or more threaded apertures 182. Flapper-type valve 183 may be any size, shape, and material which may prevent fluid communication through fluid aperture 181 when flapper-type vale 183 may be positioned in a closed configuration. In embodiments, flapper-type valve 183 may be formed from a suitable flexible material such as rubber or fiber-reinforced rubber.

Figure 6A:
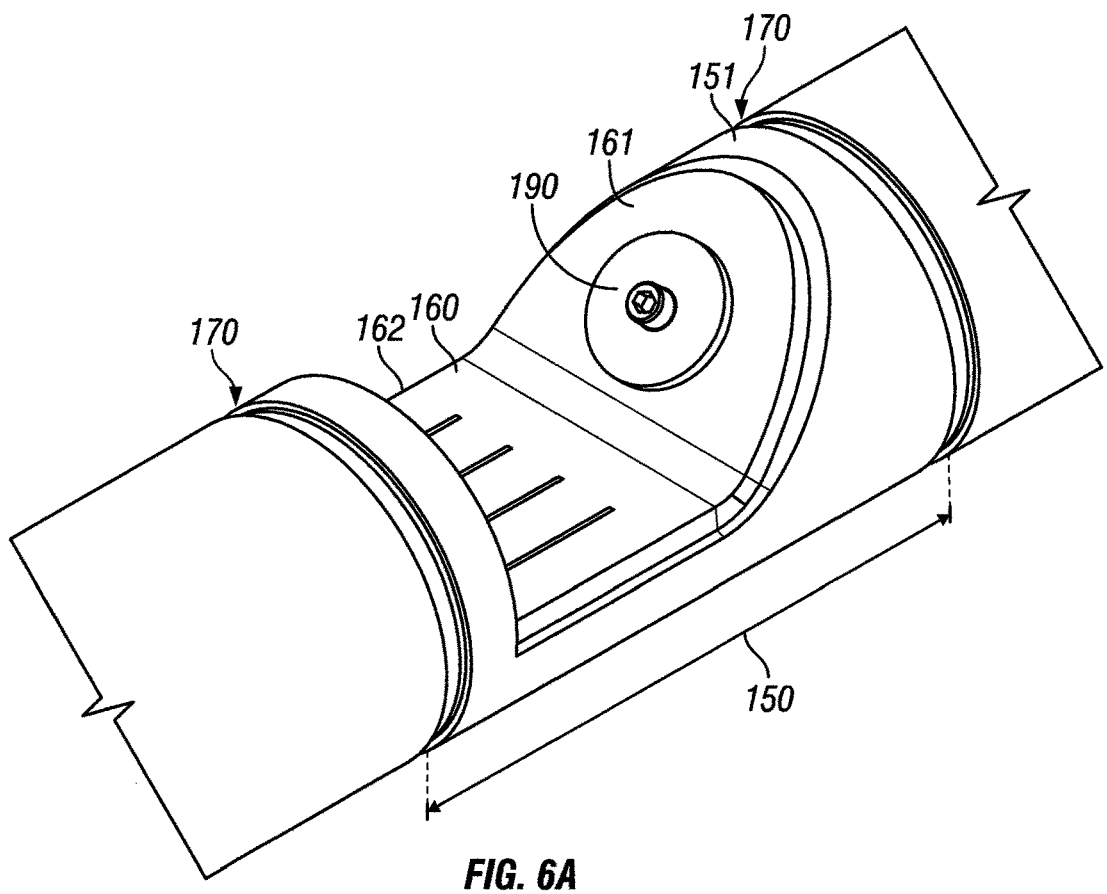
FIG. 6a illustrates an assembled view of an embodiment of a particle trap cavity poppet-type check valve.
Figure 6B:
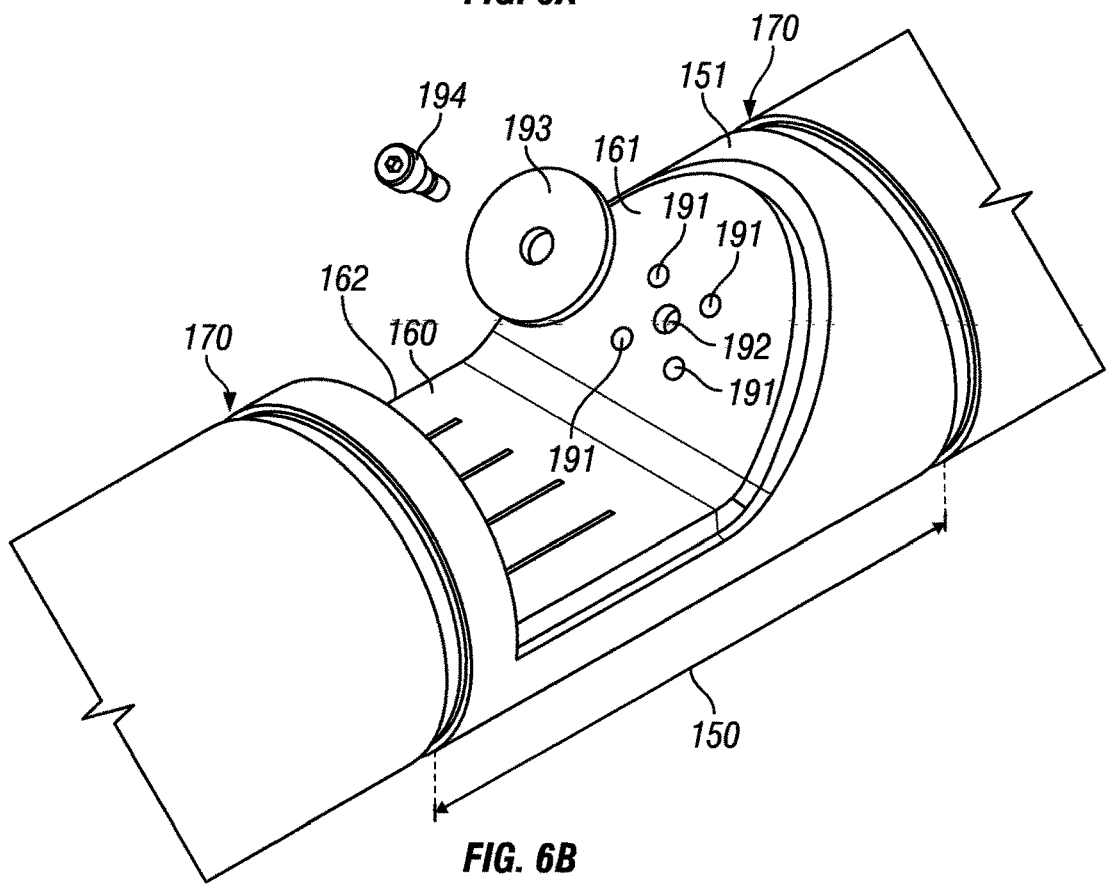
FIG. 6b illustrates an exploded view of an embodiment of a particle trap cavity poppet-type check valve.

FIGS. 6*a-b* illustrate an embodiment of a poppet-type check valve system 190, which may comprise one or more fluid apertures 191 and threaded aperture 192 located on cavity surface 160, poppet-type valve 193, and threaded fastener 194. Poppet-type valve 193 may be any size, shape, and material which may prevent fluid communication through the one or more fluid apertures 191 when poppet-type vale 183 may be positioned in a closed configuration. In embodiments, poppet-type valve 193 may be formed from a suitable metallic material such as steel, stainless steel, aluminum, copper, titanium, or other such metals, or from non-metallic materials such as plastic, composite, biodegradable, erosion-resistant, or medical-grade materials, or any combinations thereof.

In operation, particle trap 100,200 may enable a method of trapping particulate matter disposed in a fluid without diverting the direction of fluid flow through the apparatus substantially from a desired, intended, or designed primary direction of fluid flow. More specifically, the flow of fluid through the apparatus may not be required to be diverted at angles perpendicular or greater to the desired, intended, or designed primary direction of fluid flow, and instead the direction of fluid flow may remain parallel to, or generally parallel to, the desired, intended, or designed primary direction of fluid flow.

The method begins by receiving a fluid which may comprise particles or particulate matter at a first end of a housing 110,210 through connector component 120,220. In the first embodiment of particle trap 100, fluid flow through the first end of housing 110 may be initiated to follow a circulating or oscillatory flow pattern by flow initiator sub-assembly 140 through a plurality of cavity sub-assemblies 150, as illustrated at 301 in FIG. 1. In the second embodiment of particle trap 200, fluid flow through the first end of housing 210 may be controlled by check valve system 240, which may prevent back-flow of the fluid which has entered housing 210 should the rate of fluid flowing into housing 210 slow or become modulated, cyclical, irregular, or suspended. Fluid entering housing 110,210 may then flow past each of the one or more cavity sub-assemblies 150,250 disposed in housing 110,210. In embodiments wherein cavity surface 160,260 may be provided with one or more apertures along upstream surface 161,261 or longitudinal surface 162,262, or may be provided with one or more check valve systems, such as those illustrated in FIGS. 5*a-b* or 6*a-b*, fluid may also in part flow through each of the one or more cavity sub-assemblies 150,250. The method may produce a pattern of fluid flow through particle trap 100,200 which may provide alternating portions laminar flow and turbulent flow. As illustrated in FIG. 1, the method may produce an oscillatory flow pattern which may comprise a portion of laminar flow 302 external to each cavity formed by cavity surface 160 and a portion of turbulent flow 303 internal to each cavity formed by cavity surface 160. Under conditions wherein the fluid continues flowing through housing 110,210 in the primary direction of flow, the fluid may exit particle trap 100,200 through a second end of housing 110,210 and connection component 130,230.

Under conditions wherein the fluid flow rate through particle trap 100,200 may slow or become suspended, in the first embodiment not comprising a check valve the fluid may "fall back", wherein flow of the fluid through particle trap 100 may temporarily deviate or be reversed from the primary direction of fluid flow, while in the second embodiment comprising check valve sub-assembly 240, check valve sub-assembly 240 may close and thus prevent the fluid from exiting particle trap 200 through connection component 220. Similarly, in an embodiment comprising a check valve system located along surface 160,260 such check valve may transition to a closed configuration. During such operational periods where the flow of fluid through particle trap 100,200 slows, becomes suspended, or reverses, particles or particulate matter in the fluid may settle and begin to collect in the one or more cavities formed by cavity surface 160,260. In embodiments, particles may progressively fill each of the one or more cavities progressively, for example initially collecting in a cavity positioned closest to a second end of housing 110,210, then in a second cavity from the second end of housing 110,210, and then progressively in a third, fourth, etc., cavity from the second end of housing 110,210. This progressive filling of cavities is illustrated in FIG. 2, where fluid flow through particle trap 100 has become suspended and cavity 310 may first become filled, followed by cavity 311, followed by cavity 312, followed by cavity 313.

Upon the restoration of fluid flow through particle trap 100,200 in the primary direction, the method may continue as the flow returns to the oscillatory pattern of alternating laminar and turbulent flow, respectively past and through each of the cavities formed by cavity surface 160,260. In embodiments comprising a check valve disposed about cavity surface 160,260, such check valve may transition to an open configuration. The restoration of turbulent flow within each cavity may cause particles that had become collected in the cavity to be lifted by the turbulent flow, and the particles may then be caught by the laminar flow oscillating between each cavity and through particle trap 100,200. In this manner, the restoration of fluid flow in the primary direction through particle trap 100,200 may induce a self-cleaning step of the method whereby particulate matter which had become collected in the one or more cavities is removed from particle trap 100,200 by the fluid flow in the primary direction, and each cavity may thus self-clean independently.

The particle trap apparatus and method described herein may be suitable for a wide range of industries and applications, including but not limited to wellbore operations, household, automotive, aerospace, maritime, and medical applications, and may present a number of advantages over prevailing particle trap designs. Among these, particle trap 100,200 may provide an unrestricted fluid flow path in the primary direction of fluid flow as well as in the opposing direction. In certain applications this may allow injection of fluids in the direction opposite to the primary flow of fluid. For example, where particle trap 100,200 may be disposed in a wellbore application, fluids may be injected through particle trap 100,200 and into a surrounding formation. In embodiments wherein cavity profile 152,252 may eclipse greater than one-half of the cross sectional area of cavity frame 151,251, particle trap 100,200 may be provided with multiple cavity surfaces extending past the centerline of the tool, which may in-turn enable particle trap 100,200 to be used in non-vertical applications. Additionally, by disposing a plurality of cavity profiles 152,252 in opposing radial orientations throughout particle trap 100,200, as illustrated in FIGS. 10*a-b*, or in progressively differing radial orientations, as illustrated in FIGS. 11*a-d*, particle trap 100,200 may be provided with 360 degrees of effective sand containment without requiring the fluid flow through particle trap 100,200 to deviate substantially from a primary direction of fluid flow.

Although the present invention and its advantages have been described in detail, it should be understood that various changes, substitutions and alterations may be made herein without departing from the spirit and scope of the invention as defined by the appended claims.

What is claimed is:

1. A particle trap apparatus, comprising:
   a housing;
   a first connection component disposed at a first end of the housing;
   a second connection component disposed at a second end of the housing; and
   a plurality of cavities disposed longitudinally in the housing,
   wherein each of the plurality of cavities comprises a cavity surface comprising one or more apertures and one or more check valves.

2. The particle trap apparatus of claim 1, wherein the cavity surface of each of the plurality of cavities comprises an upstream portion and a longitudinal portion.

3. The particle trap apparatus of claim 2, wherein the longitudinal portion is oriented parallel to a primary direction of fluid flow through the particle trap apparatus.

4. The particle trap apparatus of claim 2, wherein the upstream portion is oriented at an angle from a longitudinal reference line following lengthwise along the particle trap apparatus, wherein the angle extends past a cross-sectional centerline of the particle trap in a primary direction of fluid flow through the particle trap between about 90 and about 180 degrees.

5. The particle trap apparatus of claim 4, further comprising a flow initiator disposed at the second end of the particle trap apparatus and having a surface which is oriented at the angle, wherein the flow initiator is disposed in the particle trap in an axial orientation offset from the upstream portion of the cavity surface of an adjacent cavity.

6. The particle trap apparatus of claim 1, wherein at least one of the one or more apertures comprises a slot having a longitudinal orientation parallel to a primary direction of fluid flow through the particle trap apparatus.

7. The particle trap apparatus of claim 1, wherein the check valve is a flapper-type check valve.

8. The particle trap apparatus of claim 1, wherein the check valve is a poppet-type check valve.

9. A method of trapping particulate matter disposed in a fluid, comprising:
   providing a particle trap having a longitudinal axis, wherein the particle trap allows a fluid to flow along the longitudinal axis in a first direction or separately in a second direction, wherein the second direction comprises a direction which is a reverse of the first direction;
   flowing a fluid including particulate matter through the particle trap at an initial rate of fluid flow, wherein the flowing comprises the fluid flowing through the particle trap in the first direction;
   directing the fluid at least partially through one or more cavities disposed along the longitudinal axis of the particle trap,
   wherein each of the one or more cavities comprises a cavity surface comprising one or more apertures and one or more check valves;
   trapping at least a portion of the particulate matter in at least one of the one or more cavities when the rate of fluid flow slows or becomes suspended, or the flowing reverses such that the flowing comprises the fluid flowing in the second direction; and
   cleaning the one or more cavities as the rate of fluid flow is restored to the initial rate of flow or as the flowing returns to comprising the fluid flowing through the particle trap in the first direction.

10. The method of claim 9, wherein the flowing further comprises flowing the fluid in the first direction along an oscillating path past each of the one or more cavities.

11. The method of claim 10, wherein the flowing further comprises flowing the fluid laminarly along a surface of at least one of the one or more cavities.

12. The method of claim 10, wherein the flowing further comprises flowing the fluid turbulently within at least one of the one or more cavities.

13. A system for trapping particulate matter disposed in a fluid produced from a wellbore, comprising:
   production tubing disposed in a wellbore, the production tubing configured to flow a fluid produced from the wellbore;
   a particle trap apparatus connected to the production tubing, the particle trap apparatus comprising:
      a housing,
      a first connection component disposed at a first end of the housing,
      a second connection component disposed at a second end of the housing, and
      a plurality of cavities disposed longitudinally in the housing,
      wherein each of the plurality of cavities comprises a cavity surface comprising one or more apertures and one or more check valves;
   a lifting device connected to the particle trap apparatus, the lifting device configured to flow the fluid at a rate of flow into the production tubing through the particle trap apparatus;
   wherein the particle trap apparatus collects particulate matter disposed in the fluid when the rate of flow slows, becomes suspended, or reverses.

14. The system of claim 13, wherein the lifting device comprises an electronic submersible pump.

15. The system of claim 13, wherein the lifting device comprises a gas lift device.

* * * * *